United States Patent [19]

Fournier

[11] Patent Number: 5,684,489

[45] Date of Patent: Nov. 4, 1997

[54] POSITION-FINDING APPARATUS FOR LOCATING A VEHICLE TRAVELLING ALONG MEANS FOR PROPAGATING ELECTROMAGNETIC WAVES

[75] Inventor: Denis Fournier, Chatillon, France

[73] Assignee: GEC Alsthom Transport SA, Paris, France

[21] Appl. No.: 603,426

[22] Filed: Feb. 20, 1996

[30] Foreign Application Priority Data

Feb. 21, 1995 [FR] France .................. 95 01983

[51] Int. Cl.$^6$ .................................................. G01S 13/93
[52] U.S. Cl. .................................. 342/22; 342/118
[58] Field of Search .................. 342/146, 42, 118, 342/22; 246/122 R

[56] References Cited

U.S. PATENT DOCUMENTS 4,207,569  6/1980  Meyer .................................. 342/42

FOREIGN PATENT DOCUMENTS

| 3124068A1 | 1/1983 | Germany . |
| 2270438 | 3/1994 | United Kingdom . |
| WO8703698 | 6/1987 | WIPO . |

Primary Examiner—Daniel T. Pihulic
Attorney, Agent, or Firm—Sughrue, Mion, Zinn, Macpeak & Seas, PLLC

[57] ABSTRACT

The present invention relates to apparatus for locating a vehicle V travelling along propagation means P. An object of the apparatus of the invention is to determine the position of the vehicle V, i.e. to determine the distance D between the vehicle V and a given point along the propagation means P. Application in particular to rail transport.

11 Claims, 3 Drawing Sheets

POSITION-FINDING APPARATUS FOR LOCATING A VEHICLE TRAVELLING ALONG MEANS FOR PROPAGATING ELECTROMAGNETIC WAVES

The present invention relates generally to transport systems, in particular systems driven entirely automatically, and more particularly to position-finding apparatus for locating a vehicle travelling along means for propagating electromagnetic waves.

BACKGROUND OF THE INVENTION

The transmission system of the present invention is designated by the system name IAGO for "Informatisation et Automatisation par Guide d'Ondes" (waveguide computerization and automation), and it is based on using a radiating waveguide.

This transmission system makes it possible to provide high data-rate both-way continuous communication between fixed equipment and moving equipment.

The radiating waveguide is an aluminum transmission medium placed along the track.

The radiating waveguide conveys information from the ground or from the moving equipment at frequencies in the 2.4 GHz to 2.5 GHz band for industrial, scientific, and medical applications.

In addition to transmitting information, the transmission system makes it possible to know the real speed of the moving equipment as well as its absolute position along the track.

Prior art position-finding apparatus for locating moving equipment relative to the ground is based on the principle of the moving equipment reading a binary code etched on a waveguide.

The code is implemented by disposing position-finding symbols appropriately relative to the network, which position-finding symbols are composed of sectoral slots serving to transmit information.

Such a position-finding system is described in the Applicant's Patent FR 2 680 876 "A position-finding system using microwave-frequency electromagnetic waves".

A symbol, corresponding to one bit of the code, is constituted by a longitudinal slot.

The symbols are read by measuring the phase difference between the signals output by two antennas placed under the moving equipment.

A symbol is distinguished from its complement by the disposition of a longitudinal slot relative to the adjacent sectoral slots.

The information corresponding to the instant at which the phase difference value is acquired is obtained from the signals picked up at a frequency equal to 2.7 GHz.

Thus, for a measurement acquired for a given symbol, the positions of the position-finding antennas relative to the symbols gives a positive or a negative phase difference corresponding to a bit or to its complement.

OBJECTS AND SUMMARY OF THE INVENTION

An object of the invention is to provide communications apparatus for enabling communication to be performed between a control and/or monitoring point and a vehicle travelling along propagation means making it possible to locate vehicles, in particular rail vehicles, very accurately so as to achieve the objects indicated below.

Another object of the communications apparatus of the invention is to solve the problems of having to stop or "dock" accurately on platforms equipped with platform-edge safety doors.

Another object of the communications apparatus of the invention is to reduce the interval between two trains so as to make it possible to run trains on the "deformable moving section" principle.

The moving section principle is based on the fact that the track is no longer divided up geographically to define a succession of non-deformable fixed sections, but rather it is organized virtually to define a succession of moving sections.

Furthermore, the succession of moving sections is composed of deformable sections because the start and the end of each of the sections have positions that are liable to move.

In other words, the deformable moving section principle is based on the fact that the rear of the preceding vehicle becomes the stop point for the following vehicle.

An advantage of such a deformable moving section principle lies in the fact that it makes it possible to reduce the interval between vehicles.

Another object of the communications apparatus of the invention is to make it possible to reverse the direction of the vehicles automatically.

Another object of the communications apparatus of the invention is to make it possible to initialize stationary vehicles for the purposes of performing operations such as automatic direction-reversal, or automatic "shunting".

The invention provides position-finding apparatus for locating a vehicle V travelling along propagation means P for propagating electromagnetic waves, said position-finding apparatus including:

transmit means E for transmitting transmitted electromagnetic waves $\Sigma_e$;

reflection means R' for reflecting said transmitted electromagnetic waves $\Sigma_e$;

receive means R for receiving the reflected electromagnetic waves $\Sigma_r$ reflected by said reflection means R.;

comparator means C for comparing said transmitted electromagnetic waves $\Sigma_e$ with said reflected electromagnetic waves $\Sigma_r$; and processing means T for processing the result obtained by said comparator means, so as to make it possible to determine the distance D between said vehicle V and said reflection means R';

said propagation means P for propagating said transmitted electromagnetic waves $\Sigma_e$ and said reflected electromagnetic waves $\Sigma_r$ being radiating propagation means.

In a first preferred embodiment, the position-finding apparatus of the invention for locating a vehicle travelling along propagation means satisfies the following characteristics:

said transmit means E for transmitting said transmitted electromagnetic waves $\Sigma_e$, said receive means R for receiving said reflected electromagnetic waves $\Sigma_r$, said comparator means C, and said processing means T are supported by said vehicle V; and said reflection means R' for reflecting said transmitted electromagnetic waves $\Sigma_e$ are associated with said radiating propagation means P, and are disposed on the ground.

In another preferred embodiment, the position-finding apparatus of the invention for locating a vehicle travelling along propagation means satisfies the following characteristics:

said transmit means E for transmitting said transmitted electromagnetic waves $\Sigma_e$, said receive means R for receiving said reflected electromagnetic waves $\Sigma_r$, said comparator means C, and said processing means T are associated with said radiating propagation means P, and are disposed on the ground; and said reflection means R' for reflecting said transmitted electromagnetic waves $\Sigma_e$ are supported by said vehicle V.

The position-finding apparatus of the invention for locating a vehicle travelling along propagation means also satisfies any of the following characteristics:

said transmit means E are radar transmit means;

both said transmitted electromagnetic waves $\Sigma_e$, and said reflected electromagnetic waves $\Sigma_r$ are radar waves.

each of said transmitted electromagnetic waves $\Sigma_e$, is composed of a frequency-modulated transmitted carrier wave of constant amplitude, and each of said reflected electromagnetic waves $\Sigma_r$ is composed of a frequency-modulated reflected carrier wave;

the reflection means R' are suitable for transposing the frequency of said transmitted carrier wave composing each of said transmitted electromagnetic waves $\Sigma_e$; and the processing performed by the processing means T on the result obtained by said comparator means C relates to measuring the phase difference between said transmitted carrier wave and said reflected carrier wave.

An advantage of the position-finding apparatus of the invention for locating a vehicle travelling along propagation means is that it uses a radiating propagation waveguide that is cheap, and that is simple to install and to maintain.

Another advantage of the position-finding apparatus of the invention for locating a vehicle travelling along propagation means is that the system may operate equally well with radiating propagation means of the radiating cable type or with radiating propagation means of the radiating waveguide type.

Another advantage of the position-finding apparatus of the invention for locating a vehicle travelling along propagation means is that, when a waveguide is used, the vertical and horizontal range over which the on-board equipment can be used relative to the propagation means is much larger, which makes it possible to install the on-board system on the body of the vehicle, instead of having to install it on the bogie.

Another advantage of the position-finding apparatus of the invention for locating a vehicle travelling along propagation means is that it is no longer necessary to stop the vehicle accurately over beacons in order to perform direction-reversal or "shunting" operations.

BRIEF DESCRIPTION OF THE DRAWINGS

Other objects, characteristics, and advantages of the invention will appear on reading the following description of preferred embodiments of the position-finding apparatus for locating a vehicle travelling along propagation means, given with reference to the accompanying drawings, in which.

MORE DETAILED DESCRIPTION

Figure 1:
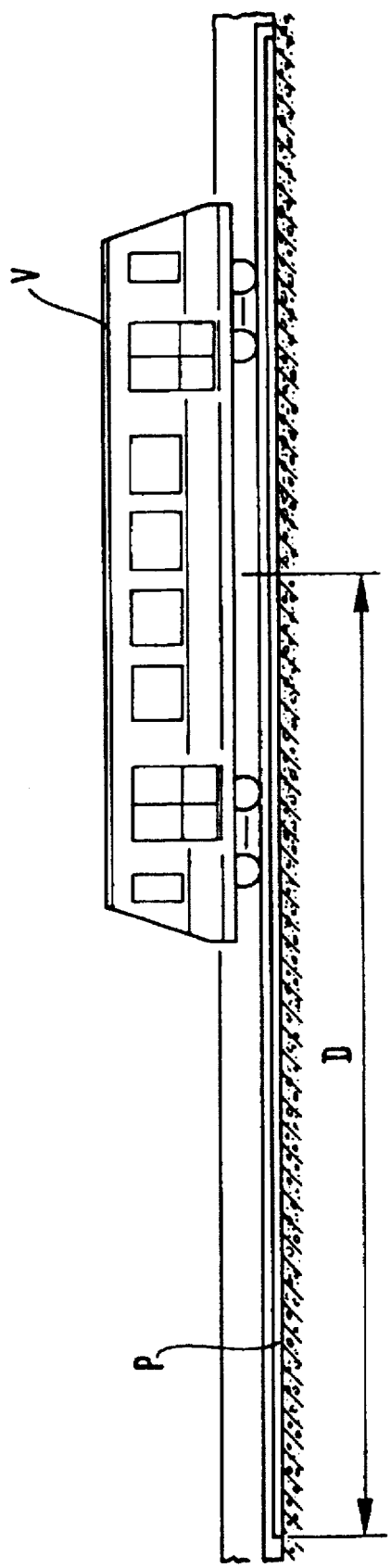
FIG. 1 is an overall diagrammatic view of position-finding apparatus of the invention for locating a vehicle travelling along propagation means.

FIG. 1 is an overall diagrammatic view of apparatus of the invention for locating a vehicle V travelling along propagation means P.

As indicated above, an object of the position-finding apparatus of the invention is to determine the position of the vehicle V, i.e. to determine the distance D between the vehicle V and a given point along the propagation means P.

Figure 2:
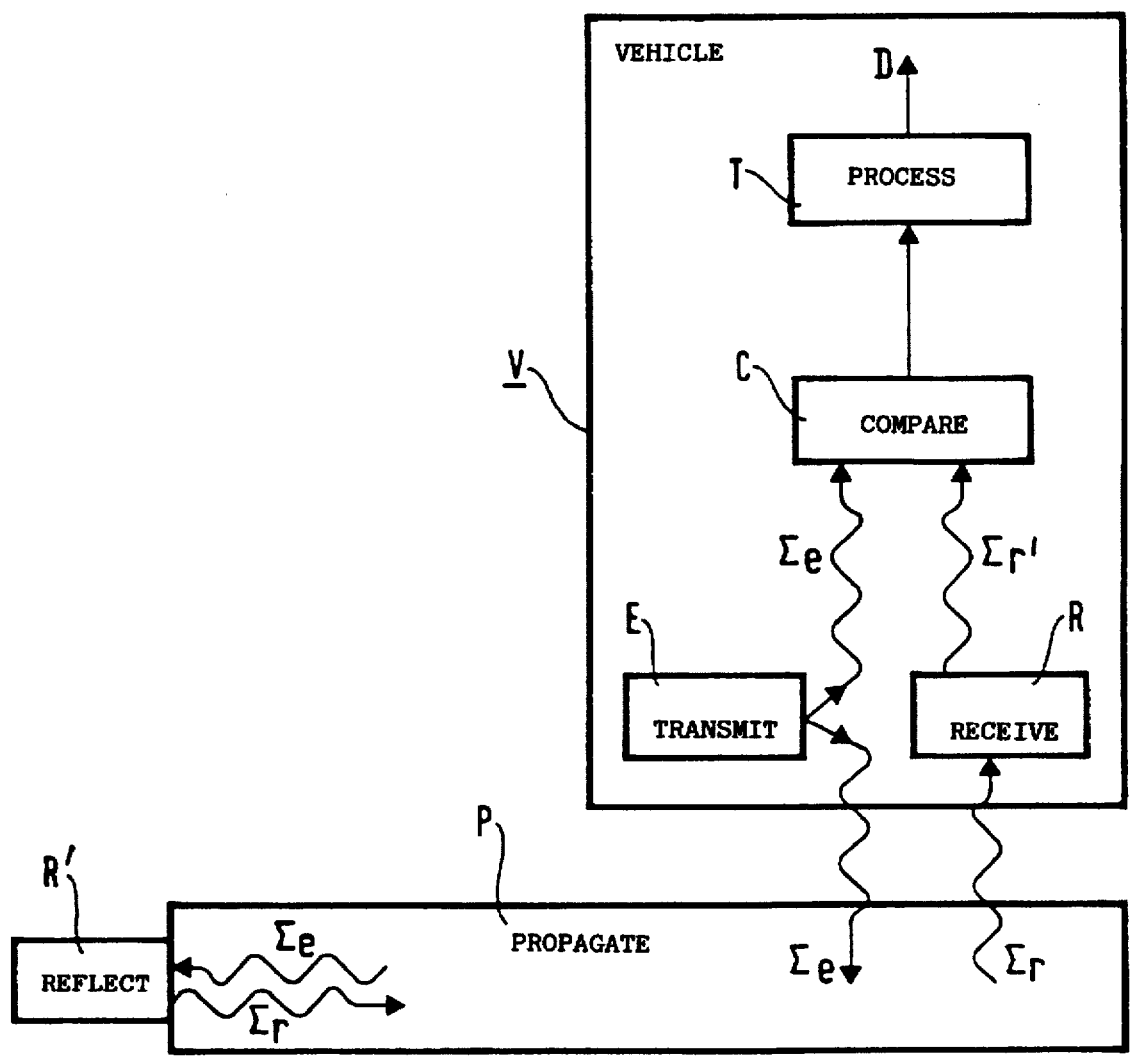
FIG. 2 is a block diagram of a first preferred embodiment of the position-finding apparatus for locating a vehicle travelling along propagation means.
Figure 3:
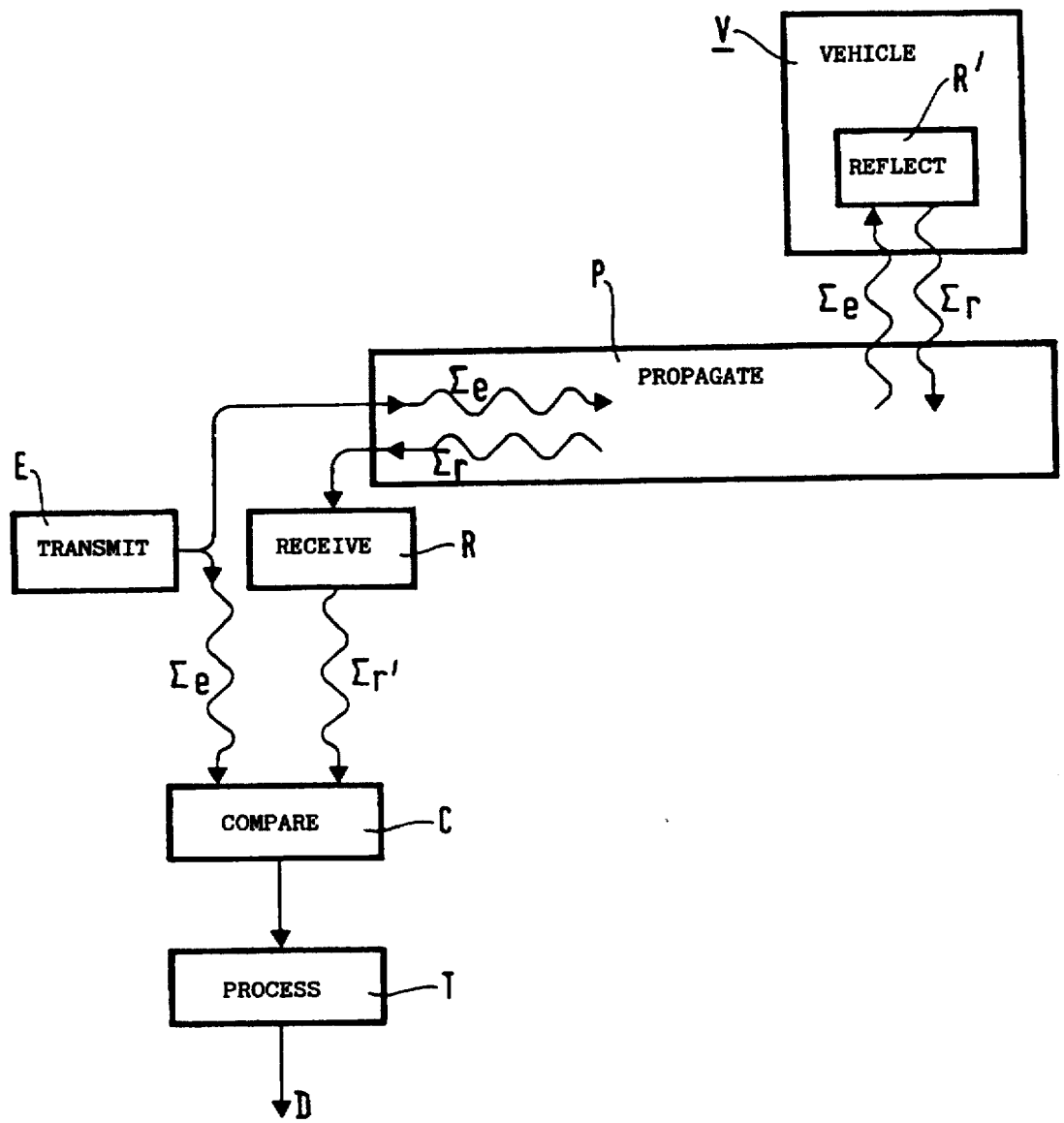
FIG. 3 is a block diagram of another preferred embodiment of the position-finding apparatus for locating a vehicle travelling along propagation means.

As shown in the block diagrams in FIGS. 2 and 3, and in accordance with the invention, the position-finding apparatus for locating a vehicle V travelling along propagation means P includes transmit means E for transmitting electromagnetic waves $\Sigma_e$, suitable for propagating along the propagation means P, and receive means R.

The position-finding apparatus also includes reflection means R' for reflecting the electromagnetic waves $\Sigma_e$ towards the receive means R.

Comparator means C compare the transmitted electromagnetic waves $\Sigma_e$ with the reflected electromagnetic waves $\Sigma_r$ reflected by the reflection means R'.

The result obtained by the comparator means C makes it possible to calculate the distance D between the vehicle V and the reflection means R', the calculation being performed by processing means T.

The propagation means P for propagating the transmitted electromagnetic waves $\Sigma_e$ and the reflected electromagnetic waves $\Sigma_r$ are radiating propagation means that radiate regardless of the physical location of the transmit means E and of the receive means R along the propagation means P.

FIG. 2 is a block diagram of a first preferred embodiment of the position-finding apparatus for locating a vehicle travelling along propagation means.

In this first embodiment, the position-finding apparatus for locating a vehicle V includes transmit means E for transmitting electromagnetic waves $\Sigma_e$ suitable for propagating along the propagation means P, and receive means R.

Both the transmit means E for transmitting electromagnetic waves $\Sigma_e$, and the receive means R are supported by the vehicle V.

The reflection means R' for reflecting the electromagnetic waves $\Sigma_e$ are associated with the propagation means P so as to reflect the electromagnetic waves $\Sigma_e$ towards the receive means R.

Preferably, both the reflection means R' and the receive means R are heterodyne-type means, i.e. the transmitted waves $\Sigma_e$ are reflected with a frequency change so as to give reflected waves $\Sigma_r$, and the reflected waves $\Sigma_r$ are received with the opposite frequency change so as to give received waves $\Sigma_{r'}$.

The various frequency changes advantageously make it possible for the receive means R to receive selectively. In particular, the waves that come from the waves $\Sigma_e$ transmitted by the transmit means E and that are reflected off the propagation means P instead of being injected into the propagation means P are not taken into account by the receive means R since they are not at the desired frequency.

The reflection means R' are disposed on the ground. The comparator means C compare the transmitted electromagnetic waves $\Sigma_e$, with the received electromagnetic waves $\Sigma_{r'}$ received by the receive means R.

The result obtained by the comparator means C makes it possible to calculate the distance D between the vehicle V and the reflection means R', the calculation being performed by processing means T.

Both the comparator means C and the processing means T are supported by the vehicle V.

FIG. 3 is a block diagram of another preferred embodiment of the position-finding apparatus for locating a vehicle travelling along propagation means.

In this other embodiment, the position-finding apparatus includes transmit means E for transmitting electromagnetic waves $\Sigma_e$ suitable for propagating along propagation means P, and receive means R.

Both the transmit means E for transmitting electromagnetic waves $\Sigma_e$, and the receive means R are disposed on the ground and are associated with the propagation means P.

Reflection means R' for reflecting the electromagnetic waves $\Sigma_e$, are disposed in the vehicle V so as to reflect the electromagnetic waves $\Sigma_e$, towards the receive means R.

Comparator means C compare the transmitted electromagnetic waves $\Sigma_e$ with the received electromagnetic waves $\Sigma_r$, received by the receive means R.

The result obtained by the comparator means C makes it possible to calculate the distance D between the vehicle V and the receive means R, the calculation being performed by processing means T.

Generally, and regardless of the chosen embodiment, the transmit means E and the receive means R are advantageously and respectively radar transmit means and radar receive means.

As a result, the transmitted electromagnetic waves $\Sigma_e$ are radar waves.

The following description relates to the first embodiment of position-finding apparatus of the invention, including radar transmission means and a radiating waveguide.

The purpose of the following description is to make it possible gain a better understanding of the position-finding apparatus of the invention.

The on-board radar transmission means inject a carrier wave into the waveguide. The carrier wave propagates along the waveguide to the ends thereof.

A transducer installed at one end of the waveguide picks up the transmitted carrier wave. The transducer is of the heterodyne type making it possible to transpose the frequency of the carrier wave. The transducer retransmits the carrier wave into the waveguide.

The transposed carrier wave propagates along the waveguide towards the vehicle, and it is received by the on-board radar receive means. The on-board radar receive means are receive means of the heterodyne type making it possible to transpose the carrier wave back to its initial frequency. Comparator means compare the transmitted carrier wave with the reflected carrier wave after the reflected carrier wave has been returned to the frequency of the transmitted carrier wave.

For example, the measurement may relate to the phase difference between the transmitted carrire wave and the reflected carrier wave. The phase difference is related to the distance D travelled by the waves.

This operation is preferably performed for a large number of frequencies. Such measurements make it possible to obtain a table of complex numbers (amplitude and phase).

By applying a Fourier transform to the table of complex numbers, it is possible to go from the frequency domain to the time domain.

It is possible to read the impulse response of the system from the table transposed from the frequency domain to the time domain. The propagation time of the waves is determined by observing the position of the peak of the impulse response.

Given the propagation speed of the waves along the waveguide, it is possible to calculate the position of the vehicle.

Another solution consists in working in the time domain, rather than in the frequency domain.

Naturally, the position-finding apparatus of the present invention may be used with propagation being through the air and with transponders placed along the track. However, phenomena related to multiple paths being present reduce accuracy.

For example, the propagation means may be constituted either by a radiating waveguide, or by a radiating cable, provided that sufficiently wide frequency bands are available.

I claim:

1. A position-finding apparatus for locating a vehicle travelling along propagation means for propagating electromagnetic waves, said position-finding apparatus including:

transmit means for transmitting transmitted electromagnetic waves;

reflection means for reflecting said transmitted electromagnetic waves;

receive means for receiving the reflected electromagnetic waves reflected by said reflection means;

comparator means for comparing said transmitted electromagnetic wave with said reflected electromagnetic waves; and processing means for processing the result obtained by said comparator means, so as to make it possible to determine the distance between said vehicle and said reflection means;

said propagation means for propagating said transmitted electromagnetic wave and said reflected electromagnetic waves being radiating propagation means.

2. A position-finding apparatus according to claim 1, in which:

said transmit means for transmitting said transmitted electromagnetic waves, said receive means for receiving said reflected electromagnetic waves, said comparator means, and said processing means are supported by said vehicle; and said reflection means for reflecting said transmitted electromagnetic wave are associated with said radiating propagation means, and are disposed on the ground.

3. A position-finding apparatus according to claim 1, in which:

said transmit means for transmitting said transmitted electromagnetic waves, said receive means for receiving said reflected electromagnetic waves, said comparator means, and said processing means are associated with said radiating propagation means, and are disposed on the ground; and said reflection means for reflecting said transmitting electromagnetic waves, are supported by said vehicle.

4. A position-finding apparatus according to claim 1, in which said transmit means is a radar transmit means.

5. A position-finding apparatus according to claim 1, in which both said transmitted electromagnetic waves, and said reflected electromagnetic waves are radar waves.

6. A position-finding apparatus according to claim 1, in which each of said transmitted electromagnetic waves is composed of a frequency-modulated transmitted carrier wave of constant amplitude, and in which each of said reflected electromagnetic waves is composed of a frequency-modulated reflected carrier wave.

7. A position-finding apparatus according to claim 1, in which the reflection means are suitable for transposing the frequency of said transmitted electromagnetic waves.

8. A position-finding apparatus according to claim 1, in which the processing performed by the processing means on the result obtained by said comparator means relates to measuring the phase difference between said transmitted electromagnetic waves and said reflected electromagnetic waves.

9. A position-finding apparatus according to claim 1, wherein said reflection means is heterodyne type, wherein said transmitted electromagnetic waves are reflected with a frequency change thus forming said reflected waves.

10. A position-finding apparatus according to claim 6, in which the reflection means are suitable for transposing the frequency of said transmitted carrier wave.

11. A position-finding apparatus according to claim 10, in which the processing performed by the processing means on the result obtained by said comparator means relates to measuring the phase difference between said transmitted carrier wave and said reflected carrier wave.

* * * * *